United States Patent [19]
Wilmot

[11] 3,868,685
[45] Feb. 25, 1975

[54] RADAR DIGITAL DETECTOR AND BEAM SPLITTER

[75] Inventor: Richard D. Wilmot, Yorba Linda, Calif.

[73] Assignee: Hughes Aircraft Company, Culver City, Calif.

[22] Filed: Nov. 20, 1970

[21] Appl. No.: 91,449

[52] U.S. Cl. ............................... 343/5 DP, 343/11
[51] Int. Cl. .............................................. G01s 9/04
[58] Field of Search ............................ 343/5 DP, 11

[56] References Cited
UNITED STATES PATENTS

| | | | |
|---|---|---|---|
| 3,353,177 | 11/1967 | Wilmot............................ | 343/5 DP |
| 3,391,403 | 7/1968 | Phillips, Jr. ....................... | 343/5 DP |
| 3,517,172 | 6/1970 | Dillard............................. | 343/5 DP |
| 3,571,479 | 3/1971 | Horattas et al. .................. | 343/5 DP |
| 3,610,901 | 10/1971 | Lynch.............................. | 343/5 DP |

*Primary Examiner*—Maynard R. Wilbur
*Assistant Examiner*—G. E. Montone
*Attorney, Agent, or Firm*—Paul H. Ware, William H. MacAllister

[57] ABSTRACT

This radar signal detector system utilizes a full amplitude digital moving window cross correlator that integrates all of the video amplitude information from a target illuminated by a scanning radar system. A digital integrator is provided for every range resolution cell encompassed by the radar so that automatic detection of all radar targets within the coverage area is accomplished. The detector includes optimal beam-shaped weighting to provide a substantial signal-to-noise ratio gain in the detection process and to provide an increase in detection sensitivity with a resultant increase of detection range. Also the system includes an improved peak detector or beam splitter which utilizes the weighting and detection concept in accordance with the invention and by comparison of the present data across the width of the beam with the data across the width of the beam at the previous sweep time statistically provides the target azimuth or beam center with a minimum of storage and with a high degree of accuracy.

13 Claims, 9 Drawing Figures

Richard D. Wilmot,
INVENTOR.
BY.
Walter J. Adam
ATTORNEY.

RADAR DIGITAL DETECTOR AND BEAM SPLITTER

BACKGROUND OF THE INVENTION

1. Field of the Invention

This invention relates to radar target detection systems, and particularly to an improved correlating type target detector that has a high sensitivity and includes a simplified but highly accurate arrangement for indicating the azimuth position of targets.

2. Description of the Prior Art

Conventional binary moving window radar target detectors utilize a digital memory which is synchronized to the radar's master trigger to provide a detector for every range resolution cell or bin. Each range bin in some prior art arrangements may be represented by a shift register which receives a binary quantized video signal from a digital video quantizer. During each radar sweep or radar ranging time, all range bins are sequentially accessed from the radar synchronized memory. The data in each detector is updated when its range bin is accessed by right shifting all bits in the shift register by one place so that the on-time data is shifted in and the oldest data is shifted out. The length of the shift registers correspond to the number of sweeps of the radar antenna beamwidth. In this prior art arrangement the quantized video from each range bin of each sweep is represented by a single bit and when the density of ones (video hits exceeding the quantizing threshold) in the shift register range bin exceed a predetermined ratio, a target is automatically detected. Although this type of a detector has been found to be satisfactory, it does not provide the detection sensitivity that may be desired for some types of radar detection especially at longer ranges. Relative to beam splitting with this type of detector the azimuth count of the leading edge is first detected and then stored in a memory. Upon detection of the azimuth count of the trailing edge (when the antenna has scanned past the target) the leading edge and trailing edge information is passed to a computer where the difference is divided by two and summed with a predetermined bias factor, to provide the position of the beam center. This conventional beam splitter arrangement had the disadvantage that a substantial amount of storage memory is required, at least sufficient memory to store the leading edge azimuth data for each range bin.

SUMMARY OF THE INVENTION

Briefly this target detector and target azimuth determining system is a moving window detector that includes full amplitude quantized radar video comparisons and antenna beam (or antenna lobe) shape weighting and summing so that the loss in detection sensitivity due to binary processing is minimized. The system with a cross correlation operation provides amplitude weighting so that the impulse response of the detector substantially matches the antenna beam shape to maximize the signal-to-noise ratio and provide a relatively high detection sensitivity. The system includes a highly simplified and accurate beam splitter or target azimuth determining arrangement that compares the present amplitude data across the beamwidth with the amplitude data across the beamwidth during the previous sweep period to provide an indication of a decreasing signal amplitude condition which is then statistically utilized to provide a target azimuth indicating signal. Upon determination of the azimuth indicating signal, an azimuth count signal is gated from the azimuth counter and biased to indicate the actual azimuth position of the target or the center of the beam.

It is therefore an object of this invention to provide a radar target detector of improved sensitivity.

It is a further object of this invention to provide an improved signal detector in which antenna beam shape weighting can be performed.

It is another object of this invention to provide a binary target azimuth detector system or beam splitter that provides, with a minimum of storage requirements, target azimuth position data having a high degree of accuracy.

It is a still further object of this invention to provide a target detector and azimuth determining arrangement that provides a high degree of sensitivity with a minimum of equipment requirements.

BRIEF DESCRIPTION OF THE DRAWINGS

These and other objects, features and advantages of the invention itself, will become apparent to those skilled in the art in the light of the following detailed description taken in consideration with the accompanying drawings wherein like reference numerals indicate like or corresponding parts throughout the several views wherein.

DESCRIPTION OF THE PREFERRED EMBODIMENT

Figure 1:
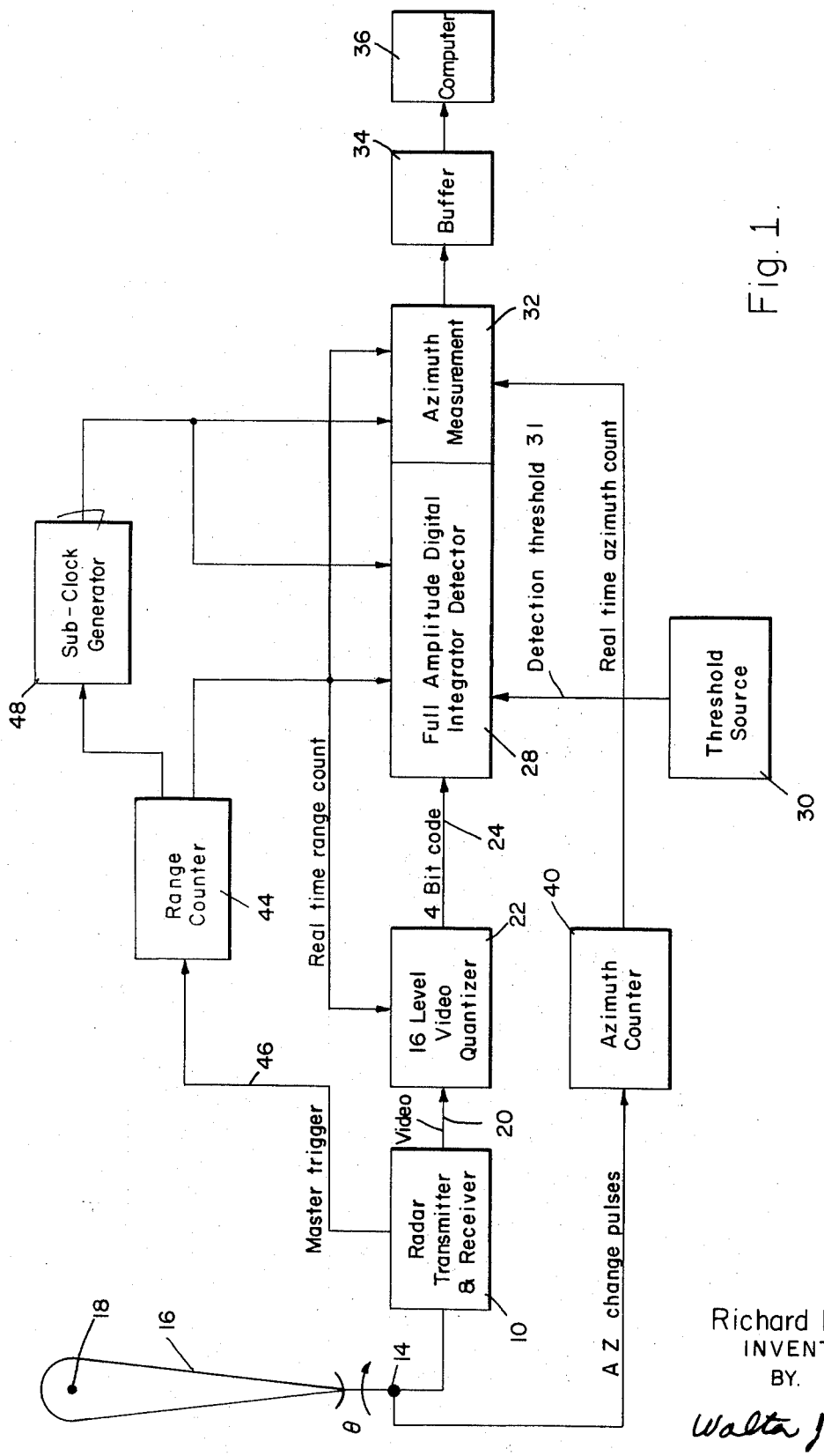
FIG. 1 is a schematic block diagram of an automatic radar target detection system including the radar target detector and azimuth measurement system of the invention.

Referring now to FIG. 1 which shows an automatic radar target detection system including the improved detector and beam splitter or target azimuth determining arrangement in accordance with the invention, a radar transmitter and receiver 10 transmits energy through an antenna arrangement 14 which may rotate through an angle — either in a continuous scan arrangement or in a scan pattern sweeping back and forth over a field of view, for example. The principles of the invention are not limited to any particular type of radar and are applicable to any pulse type scanning radar. A beam 16 is developed by the antenna 14 and, for example, may illuminate the target 18 with a beam shaped as a function of the antenna 14. Energy reflected from the target 18 is received by the antenna 14 and applied to the transmitter and receiver 10 to develop a signal such as a video or envelope signal on a lead 20, as is well-known in the art. The video signal is applied to a video quantizer 22 which, for an illustrative example, may have 16 levels and provides a suitable full amplitude binary code such as a 4-bit code on a composite lead 24. It is to be noted that the principles of the invention are not limited to operation with any particular number of bits or code and the 4-bit code shown is only for purposes of illustration. The quantized full amplitude code of the invention represents the actual amplitude of the target signal rather than a binary bit that only indicates whether a target or video amplitude is above or below a selected signal level. The full amplitude digital integrator type detector 28 in accordance with the invention may respond to the full amplitude code on the lead 24 and to a detection threshold applied on a lead 31 from a threshold source 30. An azimuth beam splitter or azimuth measurement circuit 32 is also provided and may operate in conjunction with the detector 28, in one arrangement in accordance with the principles of the invention. A buffer 34 may be provided to respond to the output of the beam splitter 32 which in turn may relay the data to a computer 36 or in some arrangements to a suitable data link. In other arrangements the azimuth measurement data may be transferred directly to a computer or to any suitable data utilization source. The system is synchronized such as by an azimuth counter 40 which may respond to azimuth change pulses from the radar antenna 14 to provide a real time azimuth count signal to the azimuth measurement circuit 32. A range counter 44 responds to a radar master trigger signal on a lead 46 from the transmitter and receiver 10 to provide range count signals during each range sweep to the quantizer 22, the detector 28 and the azimuth measurement circuit 32. Also a sub-clock generator 48 which may subdivide the range bin times into eight sub-clock periods is provided to respond to the range counter 44 and apply sub-clock timing signals to the detector 28 and to the azimuth measurement circuit 32.

Figure 2:
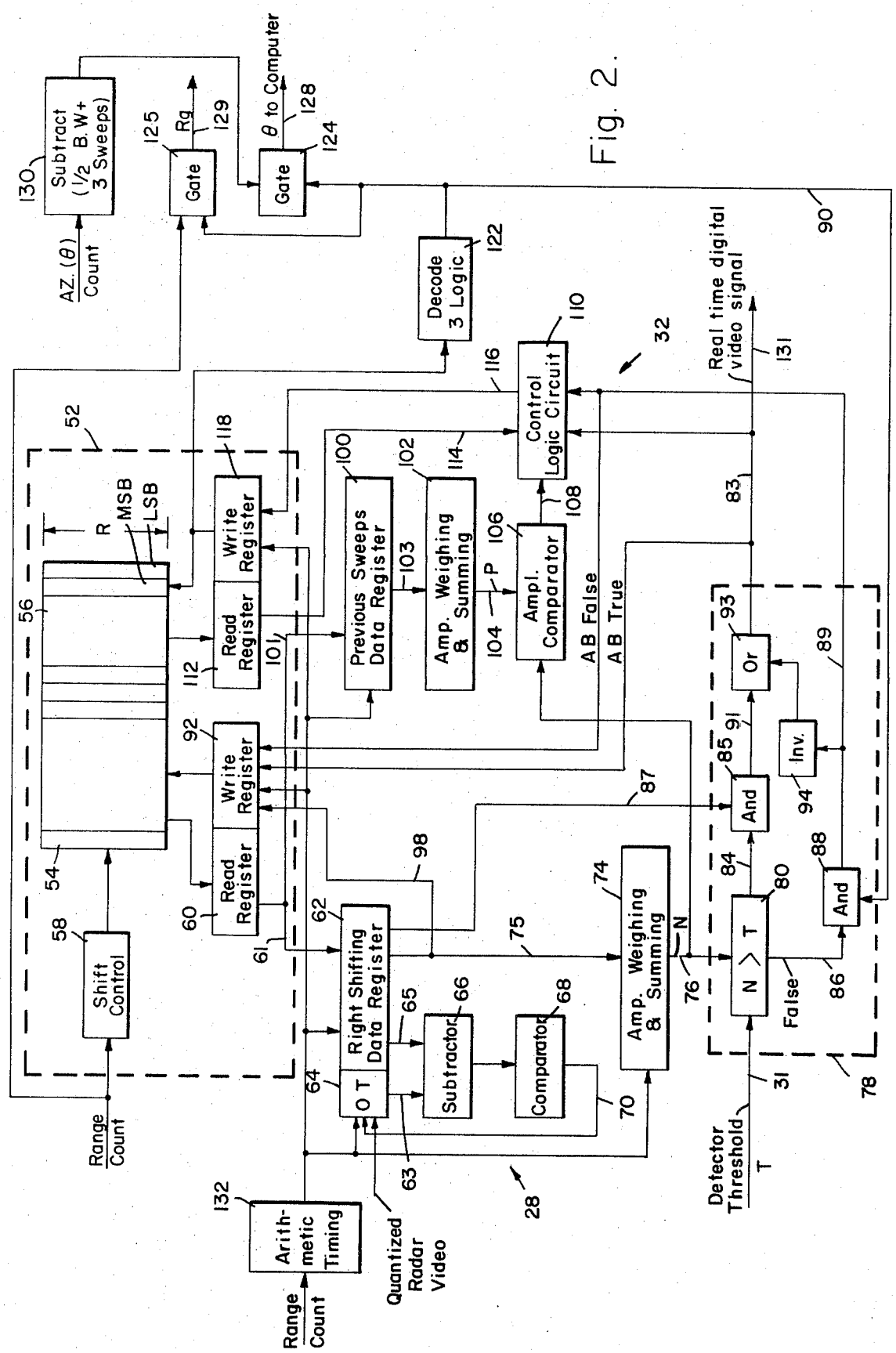
FIG. 2 is a schematic block diagram of the radar detector and azimuth measurement arrangement of FIG. 1 in accordance with the invention.

Referring now to FIG. 2 the detector 28 and the beam splitter 32 in accordance with the invention are shown in further detail, responding to the quantized full amplitude video, the detector threshold signal, the range count signal and the azimuth count signal $\theta$. A suitable memory 52 which for example may be a shift register memory having, for example, 39 shift registers each with 1,000 flip-flop sections or bit storage portions may be utilized including a detector memory portion 54 of 37 shift registers and a beam splitter portion 56 of two shift registers. In this arrangement of the memory 52, the eight 4-bit numbers represent the width of eight radar sweeps of the beam, one bit represents the active bit which indicates that the detection threshold is exceeded and two bits of the memory portion 56 represent the statistical count of decreases in radar signal amplitude over different sweeps over an illuminated target. Each shift register may recirculate in a closed loop fashion, that is, the end flip-flop which normally contains the data from the first range bin transfers its contents to the flip-flop representing range bin 1000 in response to the second range count signal. A shift control circuit 58 responsive to the range count from the range counter 44 of FIG. 1 may be utilized to control the shift of data in the 39 shift registers and the timing of read and write registers. It should be understood that the invention is not limited to any particular kind of memory but may include any suitable storage arrangement such as magnetic drums, magnetic cores, integrated circuits, delay lines or magnetic type bubble or domain storage unit, for example.

A right shifting data register 62 receives 32 bits of data from a read register 60 on a composite lead 61 with the bit numbers 33–36 of data (the oldest video data) not being shifted into the register 62 and with the bit number 37, which is the active bit AB, being received by the register 62. This shifting and effective erasing of the oldest video data is provided by an offset of the wiring between the read register and the data register 62. The read register 60 and a write register 92 may be the same register or the end flip-flops of the recirculating shift register when this type of memory is utilized, but may be separate registers when other types of memories such as a magnetic memory is utilized. The read and write register is shown as different registers for ease of understanding but it is to be understood that if the illustrated shift registers are utilized, the end flip-flops (for range bin 1) perform both functions. An on-time register 64, of 4 bit capacity for example, receives quantized full amplitude radar data from the quantizer 22 of FIG. 1 to replace the oldest quantized data shifted out of the register 62 during the above-mentioned transfer. To prevent adjacent radar interference with strong returns from creating false targets, the on-time code is compared with the code of the previous sweep and is set to zero if it is more than 30 db higher, for example, than that from the previous sweep. A subtractor 66 responds to the 4 bits of data from the on-time register and from the data of the previous sweep in the register 62 to determine if the on-time data has the large amplitude. The binary difference is then compared with a predetermined threshold level by a logical comparator circuit in a comparator 68 and if the difference is of sufficient amplitude such as representing a 30 db difference, the on-time register is reset through a composite lead 70. This arrangement eliminates most radar pulse interference without substantially affecting valid targets.

The contents of the data register 62 and the on-time register 64 are then shifted through a composite lead 75 into an amplitude weighting and summing network 74 to provide a weighted sum of the amplitudes across the antenna beamwidth, which sum may be represented by N, and which is then applied through a composite lead 76 to an amplitude comparator and logic circuit 78. The circuit 78 includes a first comparator 80 responsive to the sum N on the composite lead 76 and to the detector threshold T on the composite lead 31 to provide a true output of the bit on a lead 84 when the N sum is greater than the selected detector threshold T. The absence of a true output from the comparator circuit 80 applies a false signal through a lead 86 to an AND gate 88 which also receives a logic signal on a lead 90 representing a statistical peak determined condition for providing a false active bit and for resetting the stored active bit. An AND gate 85 receives the signal N greater than T on the lead 84 and the stored or recirculated active bit on a lead 87 to provide a true signal on a lead 91. An OR gate 93 responds to the signal on the lead 91 and the signal on the lead 89 after passing through an inverter 94 to apply a true active bit AB on the lead 83. A signal on the lead 83 representing a true active bit, in the absence of an erase condition or AB False Signal from the AND gate 88, is applied to a write register 92 to set the active bit flip-flop therein to a true state and a signal on the lead 89 at the output of the AND gate 88 indicating that the active bit is false or to be erased applies a reset signal to the active bit flip-flop of the register 92 to set that flip-flop to the false state. The active bit position of the write register 92 is set true when N is greater than T, and cannot be reset until the AND gate 88 or the erase condition is satisfied. Thus in a condition when a weak signal N falls below I before the peak statistical count is met, the active bit remains true and is only reset when the statistical count is reached. The registers may be formed of set-reset type flip-flops, although the principles of the invention are not to be limited to any particular type of registers. The write register 92 also receives the data stored in the right shifting data register 62 and the on-time register 64 through a composite lead 98 coupled to the composite lead 75, which writing operation occurs during each range bin time. It is to be noted that although as in the illustrated system the peak determining condition includes the signal falling below the threshold, other conditions such as a selected number of falls (N < P) may be utilized without the active bit condition, within the principles of the invention. The active bit is used in some systems to define the target on a display as well as to control transfer of target data to the computer. Also the active bit may be used for logical resolving targets in azimuth.

To describe the structure which principally controls the azimuth measurement of the unit 32, the memory portion 56 includes one shift register for holding the most significant bit of a logical count and one shift register for holding the least significant bit of that count. A 36-bit data register 100 may be provided to continually receive during each range sweep period, the 36 bits on a composite lead 101 from the read register 60 that represent the previous adjacent nine sweeps of data. An amplitude weighting and summing register 102 receives data from the register 100 on a composite lead 103, which summing register provides a weighted sum P during each sweep time representing the previous nine sweeps of the radar beam. An amplitude comparator 106 receives the P sum on the lead 104 and the N sum from the lead 76 to determine if there is a decrease in the amplitude of the sum from the previous radar sweep and apply signals through a composite lead 108 to a control logic circuit 110, also receiving an active bit signal on the leads 83 and 89. A read register 112 receives a 2-bit word from the memory portion 56 which is applied on a composite lead 114 to the control logic circuit 110 which in turn provides a count that is applied through a composite lead 116 to a write register 118. During each range bin period, the contents of the write register 118 are written into the memory portion 56 to provide a stored logical count of the decreases of amplitude of the return signal from a target or targets. It is to be noted that the read register 112 and the write register 118 may be the same registers when a recirculating shift register is used for the memory but may be a separate register when other type memories such as a magnetic memory is utilized.

A decode three-logic circuit 122 responds to the contents of the write register 118 to determine if the count (such as 11) represents three sequential decreases in signal amplitude and to provide a gating signal which is applied to the lead 90 and to the AND gate 88 as well as to a peak detection gate 124 for passing a modified azimuth count to a composite lead 128 and to a buffer and a computer to indicate the actual azimuth position of the detected peak. The azimuth count from the azimuth counter 40 of FIG. 1 is applied to a subtractor network 130 which subtracts one-half of the beamwidth plus three sweeps, in the illustrated arrangement, so that the information that passes through the gate 124 represents the actual beam center rather than the on-time beam center. Also to indicate the range $R_a$ of a detected target, the gating signal on the lead 90 is applied to a gate 125 which passes the range count on a composite lead 129 to a buffer and computer or suitable utilization unit. Timing of the memory 52 and the read register 60, the write register 92, the read register 112 and the write register 118 is provided by the range count from the range counter 44 (FIG. 1) while timing of the other registers is provided by the sub-clock signals received from the sub-clock generator 48 and applied to an arithmetic timing network 132, which in turn applies suitable clock signals to the registers. In the illustrated system, the sub-clock signals are also applied to the write registers 92 and 118 through suitable OR logic (not shown). In some systems the detector of the invention may provide a real time video signal from the true active bit lead 83 to a lead 131 which will provide a detected target signal in real time for utilization in a display console, for example. The amplitude comparators such as 78, 80, and 106 which may detect when one value is greater than another may be of conventional type circuits such as a subtractor with the overflow bit determining the result of the comparison.

Figure 3:
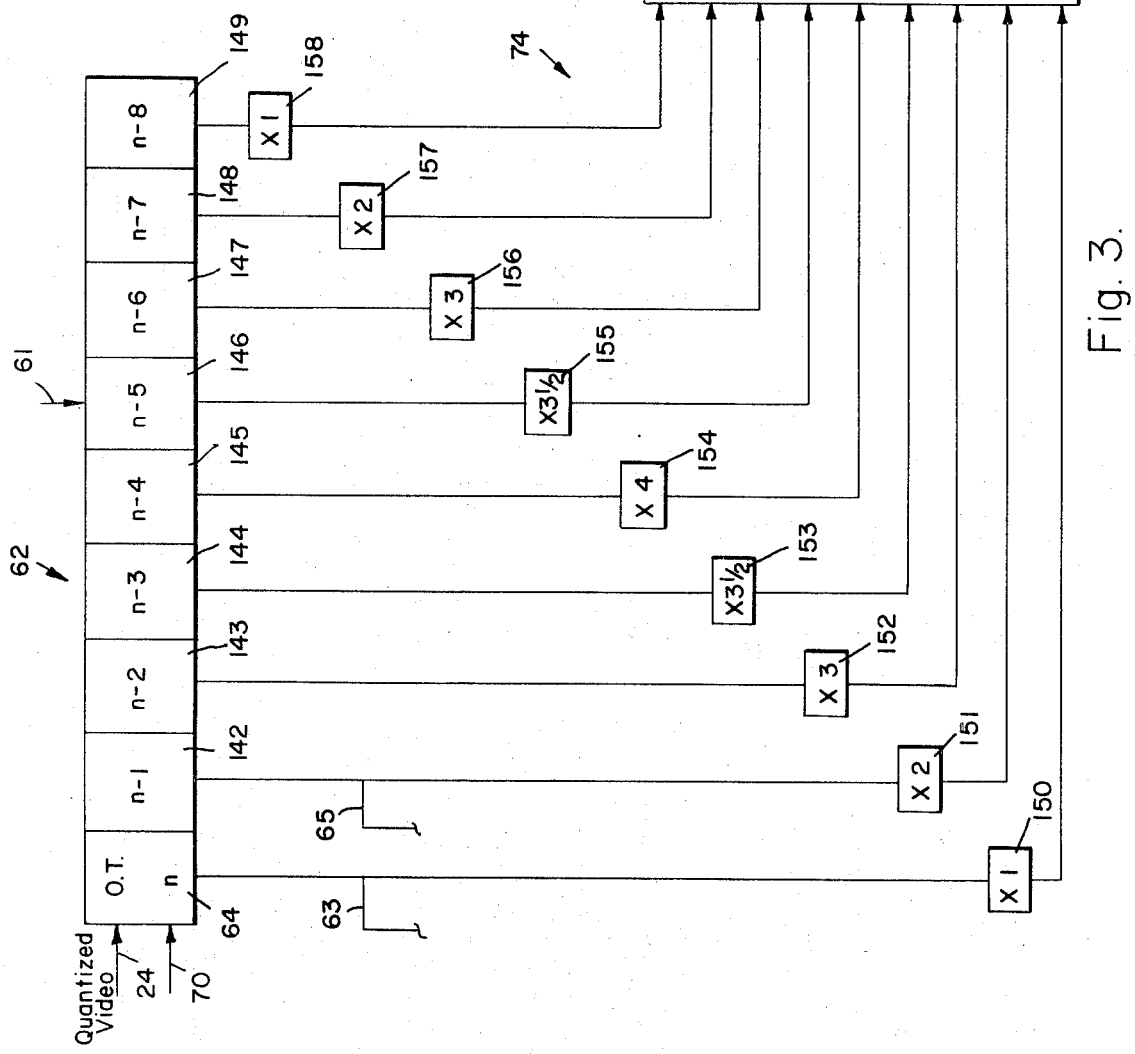
FIG. 3 is a schematic block diagram of the amplitude weighting and summing arrangement of FIG. 2.

Referring now to FIG. 3, the data register 62, the on-time register 64 and the amplitude weighting and summing network 74 are shown for explaining in further detail the optimum beam shape amplitude weighting in accordance with the detector of the invention, which weighting is substantially equivalent to a cross-correlation operation. The impulse response of the detector of the invention as a result of the variable weighting is substantially an optimum (matched) filter and the variable weighting which produces the optimum filter may be obtained without using complex multipliers. The register 62 for the system utilizing the illustrated 4-bit amplitude code, may include 4-bit register portions 142 to 149, each representing storage of data from corresponding later sweeps relative to the four bits of on-time sweep data in the on-time sweep register 64 when $n$ represents the on-time sweep data and $n - 8$ represents the data received eight sweep times earlier. The detector may provide a filter impulse response approximately matched to a Gaussian beam shape and maximize the signal-to-noise ratio out of the filter. The multiplying units 150 to 158 amplitude weight the data in the respective registers 64 and 142 to 149. A weighting of 1 may be utilized for the $n$ and $n - 8$ sweeps so arithmetic units 150 and 158 require no arithmetic processing. Thus units 150 and 158 may only be a lead but are shown because in order to match some beam shapes, multiplication may be required thereat. Weightings of two are used for the $n-1$ and $n-7$ sweeps and require only a left shift of one place of units 151 and 157. Weightings of three are used for the $n-2$ and $n-6$ sweeps of units 152 and 153 and require adding the value to the value left shifted one place, while a weighting of four used for the $n-4$ sweep of unit 154 requires a left shift of two places. The weightings of three and one-half used for the $n-3$ and $n-5$ sweeps of units 153 and 155 require adding the value to the value left shifted one place plus the value right shifted one place. Thus the system in accordance with the invention does not require the use of high speed multipliers but may utilize simplified shifting and summing arrangements. All of the variable weighting of FIG. 3 may be provided by a maximum of two shift registers in addition to the register 62 and a summer, with the total operation being formed in two sub-clock periods as will be explained subsequently. The registers of the different arithmetic unit of FIG. 3 may accumulate different numbers of bits, as well as the bit leads at the outputs thereof, because of the different multiplication factors. For example with the illustrated multiplication constants, the unit 154 develops the most bits in the answer. A summer 178 of the amplitude weighting and summing unit 74 responds to the weighted output from the multiplication units to apply a weighted sum to the lead 76 and to the comparator 78 of FIG. 2. It is to be noted that the register 100 and weighting and summing unit 102 of FIG. 2 are similar to those shown and described relative to FIG. 3.

Figure 4:
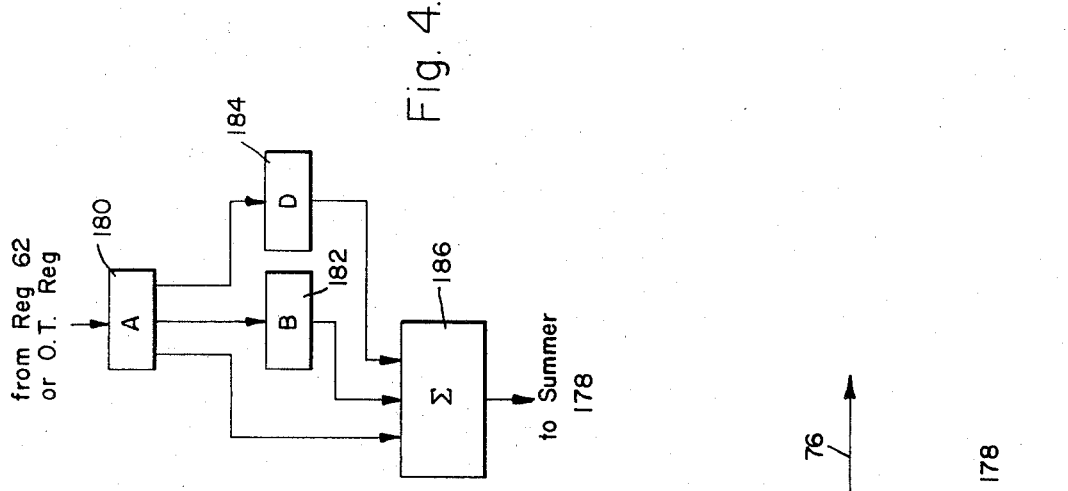
FIG. 4 is a schematic block diagram further detailing an example of a type of variable weighting calculator that may be utilized in the detector and azimuth determining arrangement of FIG. 2.

As an example of the multiplication units of FIG. 3, the schematic block diagram of FIG. 4 shows a detail of a typical multiplication unit 152 including an A register 180 which may be the register 62, a B register 182, a D register 184 and a summer 186. The A register 180 receives data from the read register 60 and the on-time data from the quantizer. The B register 182 may receive the contents of the A register left-shifted by 1 bit to provide data passed to the output of the summer 186 of two times the input data in the A register. The D register 184 may contain the contents of the A register right-shifted by one bit the B register may contain the contents left-shifted one place and the output of the summer 186 is equal to the contents of the $A + B + D$ register to provide a weighting or multiplication of three and one-half. For providing a multiplication of three, which is the input data or the A data plus two times the input data, the shifted contents of the B register is developed with only the A and B registers supplying inputs to the summer 186. To provide multiplication by four only the A and B registers are required so that A register contents is left-shifted two places into the B register and the output of the B register is applied directly through the summer 178. Thus each multiplication unit may be formed from combinations of the elements of FIG. 4 so that all of the weighting units are of a relatively simple shifting arrangement and complex multiplication is not required, in one arrangement in accordance with the invention. It is to be noted, however, that more complex multiplication arrangements may be utilized within the scope of this invention and the invention is not to be limited to any particular multiplication system. The timing of FIG. 4 requires one sub-clock period for loading the register A one sub-clock period for left-shifts and store into the register B, or for right-shifts into the register D.

Figure 5:
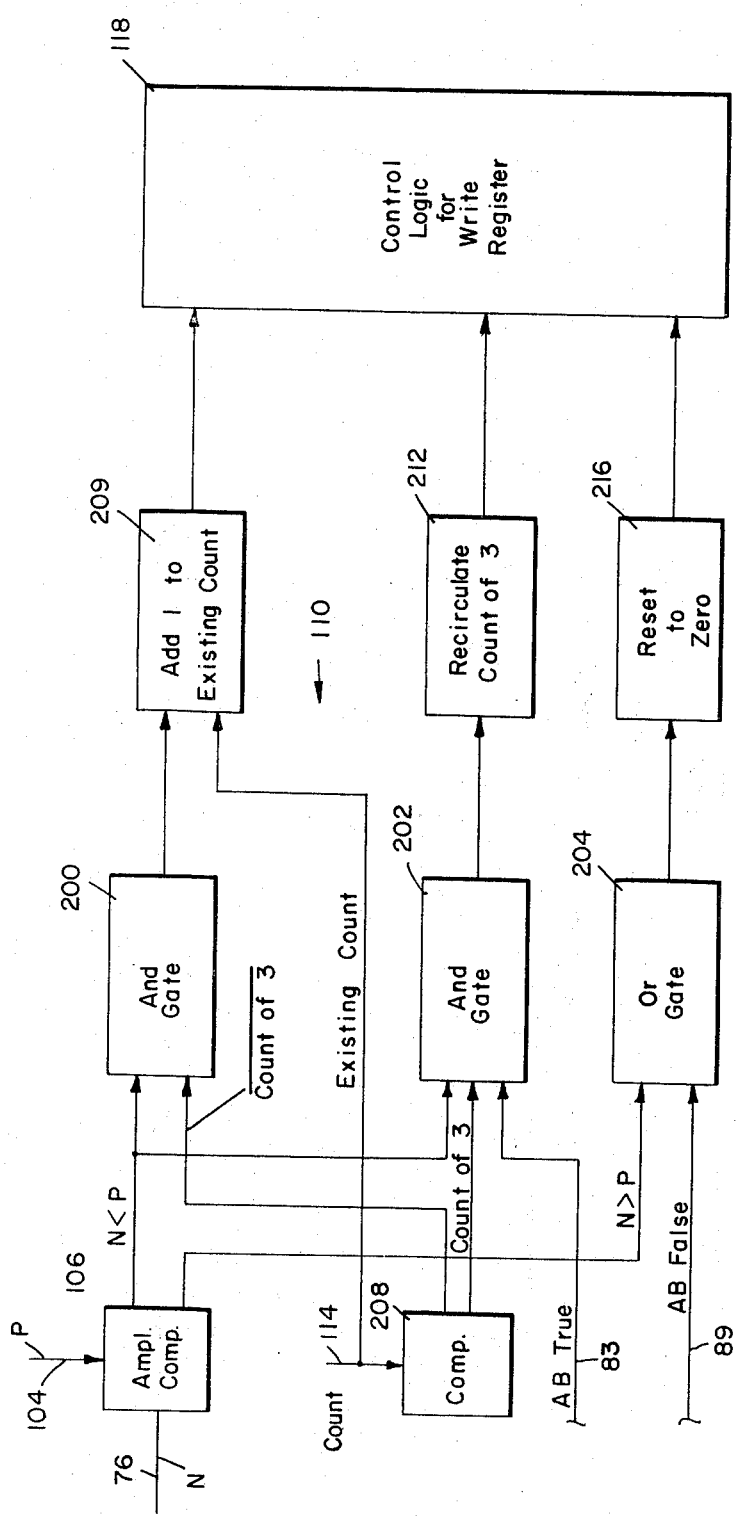
FIG. 5 is a schematic block diagram of the amplitude comparator and control logic circuit of FIG. 2.
Figure 6:
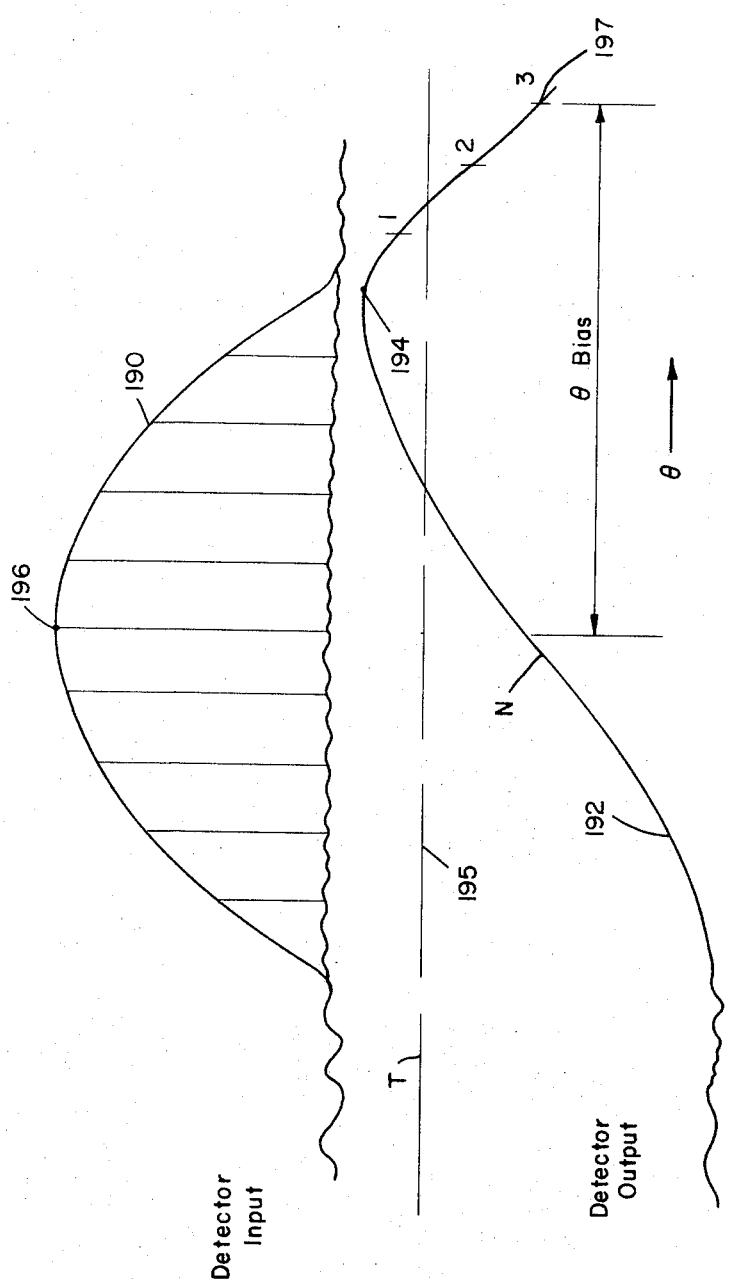
FIG. 6 is a schematic diagram of azimuth versus amplitude for further explaining the target azimuth determination in accordance with the invention.

Referring now to FIG. 5 the control logic circuit 110 utilized in FIG. 2 to provide a count representative of the trailing edge of the beam, will be explained in further detail. Referring also to FIG. 6 a signal 190 represents the video return energy from a point target over a beamwidth of nine sweeps width, for example. It is to be noted that the system operates whether or not targets are present and only when data from targets is received, does a signal such as 190 appear at the detector input. A signal 192 represents the detector output N of the return energy offset as a result of a delay of nine sweep periods in the illustrative system. If the actual peak occurs at a point 194 in the detector in accordance with the invention, a criteria is set up so that the peak is determined as a result of three decreases in amplitude from the amplitude of the previous sweep and the active bit is at zero, that is the weighted sum N is less than the threshold T indicated by a level 195. It is to be noted that the threshold level may be set by false alarm rate considerations and may be at any desired level as long as it intersects the curve 192. Upon detection of a statistical peak condition of the beam such as at a point 197 which is one-half of the width of the moving window plus 3 sweeps which with the window length equal to the beamwidth is equal to one-half the 3 db or one-half power beamwidth plus three sweep time period after the true or on-time peak 196 of the return energy or eight radar sweeps after the true peak of the video in the illustrated example, the azimuth count of the target or the beam center is applied to the computer or other utilization unit. The $\theta$ bias is constant because the detector is matched to the beam shape and whether the target is a weak or large signal, the output of the filter is always a maximum when the beam is centered in the detector (that is, when multiplying the largest values received by the largest detector weighting factors). In the illustrated arrangement of FIG. 6 the beam width is defined by the 3 db or half power point bit. It is to be understood that other beam width definitions may be utilized within the scope of the invention. The illustrated system utilizes a window length equal to the beamwidth.

The control logic circuit 110 of FIG. 5 responds to the previous sum of data P and to the information generated by the amplitude comparator and logic circuit 78 to develop a binary count which is applied to the control logic for the write register 118. The comparator 106 responds to the present or timely sum of data N and the previous data P (without the active bit) to apply a signal, when N is less than P, to an AND gate 200 and to an AND gate 202 and a signal, when N is greater than P, to an OR gate 204. A comparator 208 responds to the 2-bit count derived from the read register 112 on the lead 114 to provide a signal ($\overline{\text{count of three}}$) to the AND gate 200 and a signal when the count is equal to three, to the AND gate 202. A summing circuit 209 responds to the output of the AND gate 200 and the existing 2-bit count on the lead 114 to increment the existing count when N is less than P, which count is applied to the control logic for the write register 118. The AND gate 202 responds to the condition when N is less than P, when the count is equal to three and when the active bit is true on the lead 83, to apply a signal to a circuit 212 which generates a count of three (11) for application to the write register 118. The OR gate 204 in response to the condition N greater than P and the false active bit AB being at the true voltage level on lead 89 applies a signal to a circuit 216 which resets the write register to 00. The write register is thus set to zero or reset as a result of the N amplitude going greater than P and the active bit going false indicating in that range bin that the peak condition has been determined by the system. Thus, the azimuth or $\theta$ determining circuit in accordance with the invention, without storing the leading edge data, accurately provides the azimuth count or the beam center. It is to be noted that although in the illustrated arrangement, a count of three successive decreases in amplitude of the return signal was utilized to determine the target azimuth, other statistical requirements such as a selected number out of a total possible may be utilized within the scope of the invention.

Figure 7:
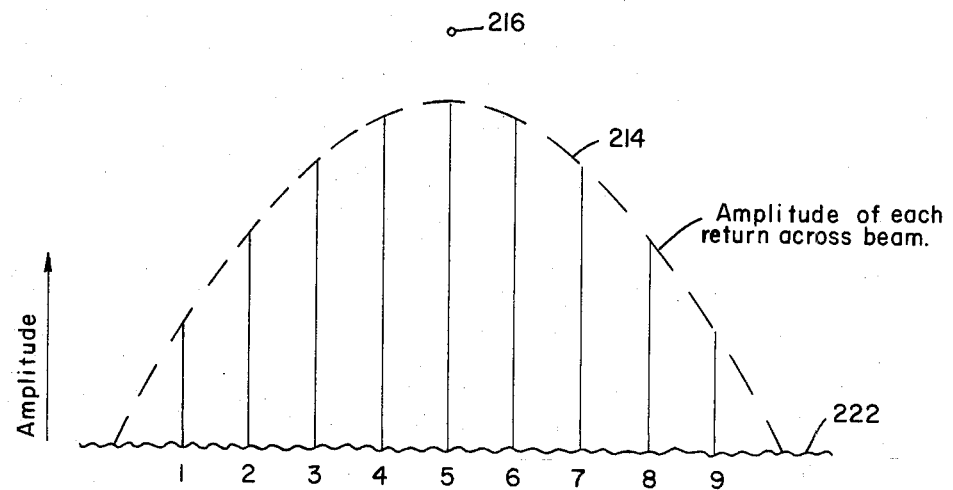
FIG. 7 is a schematic diagram of amplitude versus radar sweeps for indicating the radar beam shape and the impulse response of the detector in accordance with the invention.
Figure 7:
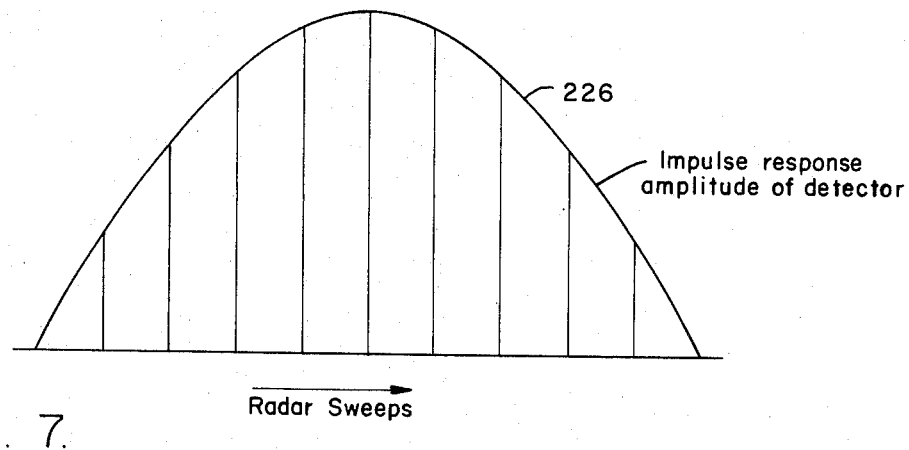

Referring now to FIG. 7 as well as back to FIG. 2, the operation of the detector in accordance with the invention will be explained in further detail. A curve 214 shows the envelope of the amplitude of each return signal across a beam having a width of nine sweeps, with some noise indicated at each sweep, in response to energy returned from a target 18 while illuminated by the beam 16 of FIG. 1. The signals are provided substantially above a receiver noise level 222. The curve 214 which represents the radar beam shape has the shape of the energy amplitude returned from the target 216 over the nine radar sweeps, that is nine returns of pulsed energy. The detector of the invention provides an impulse response of a curve 226 which substantially matches the beam shape and which may be varied to match various beam shapes other than the illustrated one by only changing the amplitude weighting constants. The detector can be matched to various beam widths by changing the number of sweeps of storage in azimuth. Because the detector is matched to the antenna voltage pattern, the signal-to-noise ratio S/N of the detector is maximized and the best azimuth estimator is the azimuth of the peak value of the output of the matched filter. The number of sweeps or pulses between the one-half power points per beam is equal to the beam width times the pulse repetition frequency divided by six times the number of revolutions per minute for a full scan type radar, for example. The number of pulses per half power beamwidth would be 10 for a 1° beam, 360 transmitted pulses per second and a scan of 6 revolutions per minute, for example. It is to be noted that the principles of the invention are not limited to any particular type of radar or type of scan, but may be utilized in any appropriate system.

Figure 8:
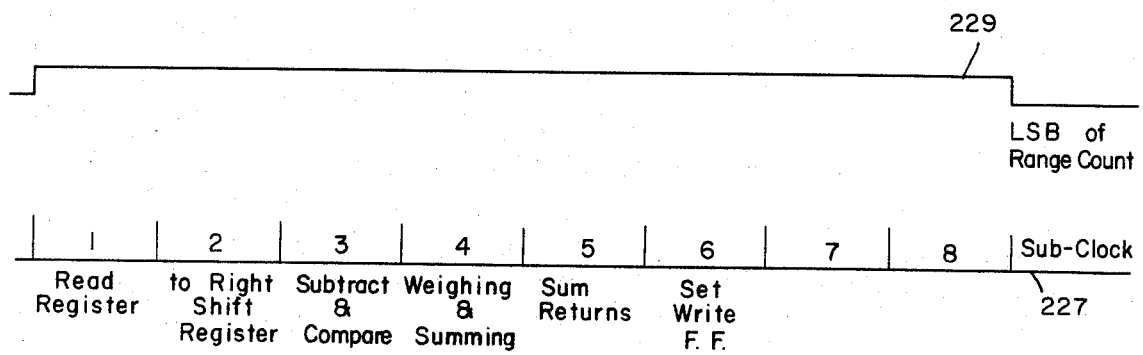
FIG. 8 is a schematic timing diagram for further explaining an example of timing for the system of FIG. 2.

Referring now to FIG. 8 as well as to FIG. 2 the read register 60 is loaded by the clock pulse at the end of a first sub-clock period of a waveform 227 and the data is shifted and stored in the right-shifting data register 62 at the end of a second sub-clock period as well as the on-time data being written into the on-time flip-flop 64. The total sub-clock period may be defined by the least significant bit duration of the range count as shown by waveform 229. During a third clock period the on-time data and the data from the last sweep are applied on respective leads 63 and 65 to subtractor 66 and the difference is applied to comparator 68 for determination of a selected difference, say 30 db, which may represent adjacent radar interference, under which condition the on-time register 64 is reset, at the end of the period, to zero so as to eliminate the undesirable effect of high amplitude interference. At the end of a fourth period the shifting or weighting and summing is performed to provide the weighting as discussed relative to FIG. 4. During a fifth sub-clock period, the weighted signals are summed by the summer of FIG. 3 and the weighted sum is compared with the threshold T of comparator circuit 78 and at the end of the fifth period the logic is available for the write register 92. At the end of a sixth sub-clock period the data is clocked into the write flip-flop both on the composite lead 98 and on the leads 83 and 89. In the illustrated arrangement in which the read registers 60 and 112 and the write registers 92 and 118 are part of shift register memory, the range count signals at the shift control 58 may be utilized to control these registers for shifting and the sub-clock pulses for the end of the sixth and fifth periods. May be also utilized with an OR gate to write the data back into the respective registers 92 and 118. The seventh and eighth clock sub-periods are not used when the read and write registers are the end flip-flops of the shift registers and may be considered respectively a delay to allow the azimuth and range count to be gated to the computer. Eight sub-clock periods may be required for other units in the system such as the quantizer.

At the rise of the next pulse of the waveform 229, the contents of the end flip-flops (or write register) are written into the flip-flops at the other end of the shift registers as data is shifted circularly in each of the shift registers. If the read and write registers are separate registers such as for use with a core memory, at least the seventh clock period is required to be utilized. With a type memory in which separate read and write registers are utilized, those registers may be solely timed from the shift control 58 by separate memory clock pulses, in some arrangements in accordance with the invention. This setting of the write flip-flop register 92 completes the detection operation which generates on active bit that may be either true or false.

The peak detection timing operation is similar during the first portion thereof with the read register 60 being loaded at the end of the first sub-clock period and the data register 62 being loaded from the read register 60 at the end of the second sub-clock period. During a third sub-clock period the peak detection may be idle. At the end of the fourth sub-clock period weighting and summing is performed. Also at the end of the fourth clock period the control logic circuit 110 is energized. At the end of the fifth sub-clock period the count for that range bin is written into the write register 118 and the decode 3 logic is available for the AND gate 88. During the sixth, seventh and eighth sub-clock periods a delay period may be provided in arrangements where separate read and write registers are not required. Thus the system operates over the same time interval not only to detect a threshold condition but to detect and generate a beam center or target azimuth reading.

Figure 9:
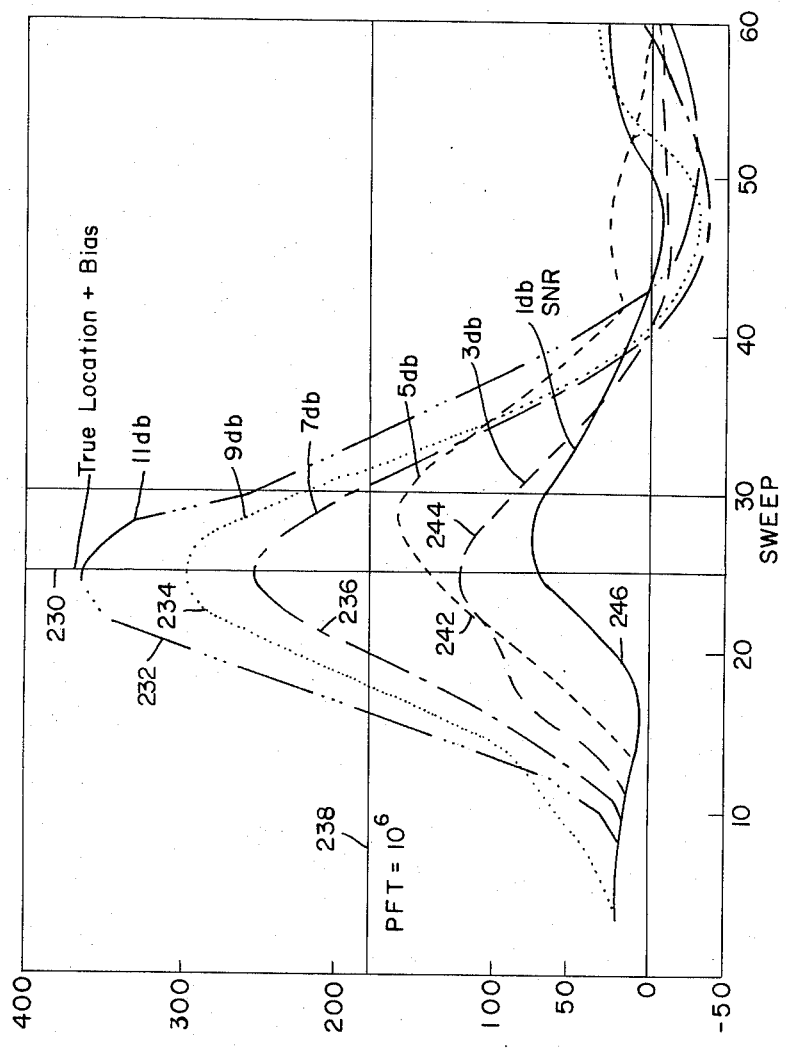
FIG. 9 is a graph of range sweeps versus target output amplitude analyzed with a simulated detector in accordance with the invention, for further showing the validity of the peak measurement in the beam splitter of FIG. 2.

Referring now to FIG. 9, an example of the accuracy of the target azimuth detection operation in accordance with the invention is indicated by simulated target output signals for a beam of 25 sweeps width. The true location + bias of the beam center is indicated by a line 230 and signals 232, 234 and 236 represent return energy above a threshold 238 and with respective signal-to-noise ratios of 11 db, 9 db and 7 db. Signals 242, 244 and 246 represent signals with signal-to-noise ratios of respectively 5 db, 3 db and 1 db which were eliminated by selection of the threshold level 238 and which do not indicate the true beam center. The threshold level 238 in the simulated system was for a probability of false targets (PFT) of $10^{-6}$. Thus with the system of the invention and with proper selection of the threshold level a highly accurate beam center is provided.

Thus a nonrecursive, antenna beam shape weighted, moving window-type correlator detector has been provided that develops highly reliable detection with a maximum signal-to-noise ratio so as to develop a high sensitivity that may allow detection of targets at substantially long ranges. Also the system of the invention provides a simplified and reliable beam splitter that with a minimum amount of storage, that is without storage of leading edges and trailing edges, develops as a result of its constant -bias, accurate beam splitting or target azimuth data and accurate range data.

I claim:

1. A system for detecting a statistical target over a plurality of range intervals and within a predetermined azimuth angle in response to transmitting pulses of energy to a target as a radar beam scanning over said target and for receiving target signals while said beam is illuminating said target comprising
   a source of quantized amplitude video data, of a plurality of bits for each target signal,
   memory means responsive to said source for storing target data quantized from target signals received over an azimuth beam width for each of a plurality of range bins,
   register means responsive to said memory means and to said source for receiving a present beam width of data,
   weighting means coupled to said register means for providing an impulse response of a predetermined beam shape,
   summing means coupled to said weighting means for providing a weighted sum of the present sweep,
   and comparator means for comparing the weighted sum with a threshold value to indicate a statistical target.

2. A system for detecting the azimuth of a target over a plurality of range intervals comprising
   a source of video binary amplitude data including a transmitter and receiver for scanning a beam past a target and transmitting a selected number N of pulses while said target is within said beam width,
   memory means responsive to said source for storing the amplitude data over a beam width,
   first register means coupled to said memory means for receiving the amplitude data from the previous N − 1 sweeps, said first register means also receiving on-time data from said source,
   first amplitude weighting means coupled to said first register means for detecting a present target sum amplitude,
   first detecting means coupled to said first amplitude weighting means for detecting a target signal,
   second register means coupled to said memory means for receiving the amplitude data from the previous N sweeps,
   second amplitude weighting means coupled to said second register means and to said first detector means for detecting a previous target sum amplitude,
   and logic means coupled to said first and second detecting means for determining a trailing edge condition representative of the target azimuth.

3. The combination of claim 2 further including comparator means coupled to said first register means for decreasing the amplitude value of the on-time data when it exceeds a predetermined threshold level.

4. A system for detecting a target over a plurality of range intervals and within a predetermined azimuth angle comprising
   a radar source of quantized full amplitude video target data of a plurality of target return signals, said radar source scanning a beam of energy past said targets with a selected number of pulses being transmitted and received over the azimuth beam width, with each pulse defining a radar sweep,
   memory means responsive to said source for storing an azimuth beam width of target data for each of a plurality of range bins across said beam during the previous sweep,
   register means responsive to said memory means and to said source for receiving a beam width of present target data,
   weighting means coupled to said register means for weighting the present target data to provide an impulse response substantially matched to the shape of the beam of energy,
   summing means coupled to said weighting means for providing a weighted sum across the beam width for the present sweep,
   and comparator means for comparing the weighted sum with a threshold value to provide a statistical target bit,
   and means coupled to said register means, to said comparator means and to said memory means for storing the present target data and the statistical target bit.

5. The combination of claim 1 further including
   means coupled to said comparator means and to said register means for providing a weighted sum of the full amplitude target data across the beam width for the previous sweep and for comparing this with the weighted sum for the present sweep and providing a signal representative of the target azimuth.

6. The combination of claim 5 further including in said means coupled to said comparator means, counting means for providing a signal representative of a predetermined trailing edge condition of the beam and means responsive to said counting means for providing said signal representative of target azimuth.

7. A system for detecting the azimuth of a target over a plurality of range intervals with the target being scanned by a radar beam having N sweeps in response to N transmitted pulses as the beam illuminates the target comprising
   a source of video binary amplitude data responsive to radar target signals,
   memory means responsive to said source for storing the amplitude data for each target signal over a beam width of N sweeps,
   first register means coupled to said memory means for receiving the amplitude data from the previous N − 1 sweeps with the on-time sweep data from said source,
   first amplitude weighting means coupled to said register means for determining a present target sum amplitude,
   detecting means coupled to said first amplitude weighting means for detecting a present detected target signal, second register means coupled to said memory means for receiving the amplitude data from the previous N sweeps, second amplitude weighting means coupled to said second register means and to said detecting means for determining a previous target sum amplitude, comparator means coupled to said detecting means and to said second amplitude weighting means for determining increases in amplitude of the weighted target data between the previous and present target sum amplitudes, and logic means coupled to said first and second comparators and to said memory means for determining a target trailing edge representative of the target azimuth.

8. A target azimuth detector operable over a plurality of azimuth positions and range intervals comprising a source of full amplitude binary target return data signals, memory means responsive to said source for storing a plurality of said signals over a selected number of azimuth positions and range intervals, a source of threshold signals having a selected threshold value, first comparator means coupled to said source of return data, to said memory means and to said source of threshold signals for providing a signal when said target data has a predetermined relation to said threshold value, second comparator means coupled to said memory means and to said first comparator means for indicating a decrease in detected amplitudes between azimuth positions, logical means coupled to said first and second comparator means for detecting a beam trailing edge signal, and means responsive to said logical means for providing target azimuth data representative of the target azimuth in response to the beam trailing edge signal.

9. A target detector operable with a radar transmitter and receiver system scanning over a target during a plurality of range sweeps in azimuth with each range sweep having a plurality of range intervals, said radar transmitter and receiver system providing quantized digital amplitude return data comprising memory means for storing data for each range interval over a selected plurality of range sweeps substantially equal to the radar beam width, first register means coupled to said memory means and to said radar transmitter and receiver system for receiving for each range bin the amplitude data from the selected range sweeps minus the data from the oldest sweep from said memory means and for receiving amplitude data of the present range sweep from said transmitter and receiver system, amplitude weighting means coupled to said first register means for weighting the amplitude data to substantially match the voltage amplitude beam shape, summing means coupled to said amplitude weighting means for summing the amplitude data over the beam width, a source of threshold data, and first comparator means coupled to said source of threshold data and to said summing means for providing a target indicating signal.

10. The combination of claim 9 further including second register means coupled to said first register means for receiving the amplitude data over the beam width of the previous sweeps, second amplitude weighting means coupled to said second register means for weighting the amplitude to substantially match the beam shape, second summing means coupled to said second amplitude weighting means to provide a sum of the previous sweeps, second comparator means coupled to said first comparator means and to said second summing means to provide a signal when the present sum is less than the previous sum, and logical means coupled to said first and second comparator means for providing a signal representative of the target azimuth.

11. The combination of claim 10 in which a logical storage memory is included in said memory means and further including in said logical means, counter means coupled to said logical storage memory responsive to the target indicating signal and to the signal when said previous sum is less than the present sum for incrementing and storing a count in said storage memory for each range bin, and a logical detection circuit responsive to a predetermined statistical condition of said count to detect a target azimuth condition.

12. The combination of claim 11 in which said logical detection circuit responds to an integral count number to provide a signal representative of the target azimuth and in which said logical means further includes a gate responsive to the signal representative of the target azimuth to gate an azimuth count therethrough.

13. A radar signal detector operable with a radar system transmitting and receiving a beam of energy toward a target over a plurality of range sweeps in azimuth and over a plurality of range bins comprising storage means coupled to said radar system and including a plurality of elements of stored full amplitude digital data, each element being representative of target return signals for a range sweep of the radar beam, said elements transferring said data therebetween each range sweep, a plurality of multipliers each responsive to a different one of said elements to provide full amplitude values to substantially match the beam shape, summing means coupled to said plurality of multipliers to provide a sum of the weighted amplitudes, and comparator means coupled to said summing means to compare said sum to a threshold value to provide a target indicating signal.

* * * * *